United States Patent [19]

Tsuji et al.

[11] 4,090,016

[45] May 16, 1978

[54] CARBOXYLATED PULLULAN AND METHOD FOR PRODUCING SAME

[75] Inventors: Kozo Tsuji, Takatsuki; Masanori Fujimoto; Fujio Masuko, both of Ibaragi; Tsuneyuki Nagase, Takatsuki, all of Japan

[73] Assignees: Sumitomo Chemical Company, Limited, Osaka; Hayashibara Biochemical Laboratories, Inc., both of Japan

[21] Appl. No.: 689,064

[22] Filed: May 24, 1976

[30] Foreign Application Priority Data

Jun. 17, 1975 Japan .................................. 50-74091

[51] Int. Cl.$^2$ ............................................ C08B 37/00
[52] U.S. Cl. ...................................... 536/1; 106/162; 264/165; 536/120
[58] Field of Search .................................. 536/1, 114

[56] References Cited

U.S. PATENT DOCUMENTS

| | | | |
|---|---|---|---|
| 3,297,604 | 1/1967 | Germino | 536/114 |
| 3,516,983 | 6/1970 | Colegrove | 536/114 |
| 3,560,480 | 2/1971 | Kruger | 536/114 |
| 3,632,802 | 1/1972 | BeMiller et al. | 536/1 |
| 3,720,660 | 3/1973 | Arendt et al. | 536/1 |
| 3,870,537 | 3/1975 | Hijiya et al. | 536/1 |
| 3,931,146 | 1/1976 | Kato et al. | 536/1 |
| 3,960,685 | 6/1976 | Sano et al. | 536/1 |

*Primary Examiner*—Johnnie R. Brown
*Attorney, Agent, or Firm*—Farrell R. Werbow

[57] ABSTRACT

Carboxylated pullulan obtained by oxidizing pullulan with an oxidizing agent is readily soluble in cold water and has favorable film-forming property, yielding a film having high mechanical strengths, high modulus of elasticity and good transparency.

2 Claims, No Drawings

CARBOXYLATED PULLULAN AND METHOD FOR PRODUCING SAME
This invention relates to a carboxylated pullulan and a method for producing same, which is characterized by oxidizing pullulan with an oxidizing agent.
Pullulan is a high-molecular-weight linear polymer having the molecular structure,
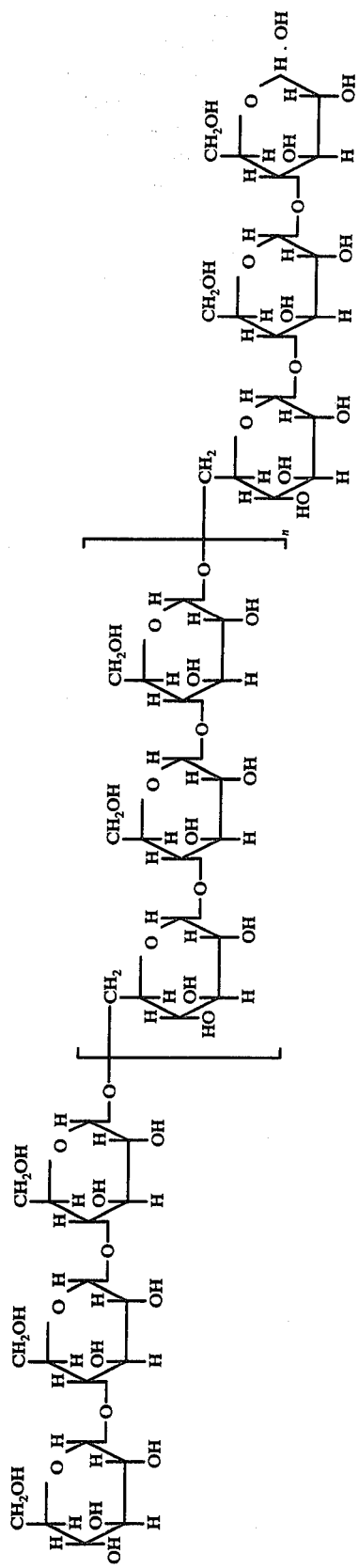

(where n is an integer of 20 to 10,000 representing the polymerization degree), in which recurring units of maltotriose, i.e. a trimer of glucose, are bonded to one another through α-1,6-linkages which are different from the linkages through which glucose units are bonded to one another in the maltotriose unit.

Although pullulan contains glucose units in its molecule, pullulan is quite different not only in molecular configuration but also in properties from such polysaccharides as starch and cellulose which are similarly made up of glucose units. For instance, starch and cellulose are difficulty soluble in cold water, whereas pullulan is easily soluble in cold water and the resulting solution is one of the least viscous solutions of water-soluble polymers, as compared at the same concentration and the same molecular weight. Aqueous solutions of pullulan are stable over a long period of time, and show neither gelation nor retrogradation. This is one of the characteristic features of pullulan, as distinguished from starches. Pullulan, moreover, has desirable film-forming property, and yields a film satisfactory in mechanical strengths, modulus of elasticity, and transparency. This is another feature which distinguishes pullulan from starches, derivatives thereof, and cellulose derivatives. It is thus evident that pullulan has properties quite different from those of starches, derivatives thereof, and cellulose derivatives.

Oxidized starches are now widely used in surface sizing and coating of paper. Oxidized starches of poluronide type are also important substances capable of forming glucuronic acid on hydrolysis with acids or enzymes. However, oxidized starches have disadvantages in that they have poor workability, being difficultly soluble in cold water, and also poor film-forming property, yielding membrane or film unsatisfactory in strengths and transparency.

The present inventors conducted extensive studies to improve the disadvantages of oxidized starches and, as the result, have found that carboxylated pullulan obtained by oxidizing pullulan has none of the difficulties mentioned above.

An object of this invention is to provide novel carboxylated pullulan and a method for producing same.

Other objects and advantages of this invention will become apparent from the following description.

According to this invention, there is provided carboxylated pullulan in which chiefly primary hydroxyl groups of pullulan have been transformed into carboxyl groups and, more particularly, a modified pullulan in which

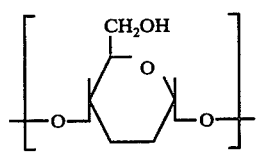

in the polymer chain of pullulan has been transformed into

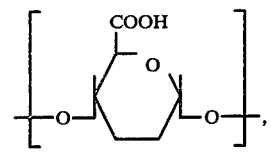

while still retaining the desirable water-solubility and film-forming property of pullulan; there is also provided a method for producing such modified pullulan by oxidizing pullulan with an oxidizing agent.

One of the main differences between the properties of carboxylated pullulan and oxidized starch is the easiness with which carboxylated pullulan goes into solution in cold water. In surface sizing and coating of paper, this property is an advantage of carboxylated pullulan in workability, because carboxylated pullulan is used as an aqueous solution.

Another advantage of carboxylated pullulan is its desirable film-forming property and the resulting film is superior in strength, modulus of elasticity, and transparency. This feature may be utilized in increasing water resistance of a water-soluble transparent film containing hydroxyl groups. For instance, a water-insoluble, transparent, high-strength film is obtained by mixing a pullulan solution and a carboxylated pullulan solution, spreading the mixed solution on a glass plate, and heat-treating the resulting film. If oxidized starch is used in place of carboxylated pullulan, there is obtained a film having inferior physical properties.

Depending on the carboxyl group content, carboxylated pullulan may be imparted with properties similar to those of alginic acid or gum arabic and may be used as a substitute for these substances. For example, carboxylated pullulan may form capsules by coacervation with a cationic compound. When hydrolyzed with acids or bacteria, carboxylated pullulan reacts more rapidly than oxidized starch and yields glucuronic acid easily and in high yields without formation of by-products. This is also one of the characteristic features of carboxylated pullulan.

The pullulan used in this invention may be produced by any method. For example, it can be isolated and recovered as an extracellular tacky substance on cultivating a strain of the genus Pullularia classified at present under Deuteromycetes (incomplete microorganism). As an example, a strain of Pullularia pullulans is inoculated into a medium containing 10% of partially hydrolyzed starch (Dextrose equivalent 42), 0.5% of $K_2HPO_4$, 0.1% of NaCl, 0.02% of $MgSO_4.7H_2O$, 0.06% of $(NH_4)_2SO_4$, and 0.04% of yeast extract and subjected to shaking culture at 24° C for 5 days, whereby pullulan is obtained as an extracellular tacky substance. The culture may be carried out also by use of glucose as the carbon source. If necessary, purified pullulan may be obtained by removing cells from the culture liquor by centrifugation and precipitating pullulan with methanol.

Although pullulan varies to some degree in properties according to the strain by which it is produced, any pullulan may be used in this invention. Molecular weight of the pullulan used in this invention is subjected to no particular lestriction, but is usually 10,000 to 5,000,000, preferably 30,000 to 1,000,000.

The oxidizing agents used in this invention to obtain carboxylated pullulan from pullulan are dinitrogen tetraoxide, potassium permanganate, potassium hypochlorite, sodium hypochlorite, air, hydrogen peroxide, nitric acid, fuming nitric acid, chromic acid, chlorine, chloric acid, potassium chlorate, nitrogen dioxide, nitric acid-sodium nitrite, phosphoric acid-sodium nitrite, and nitric acid-formic acid. Of these, fuming nitric acid, nitric acid-sodium nitrite and phosphoric acid-sodium nitrite are preferred. The amount to be used of the oxidizing agent is 0.01 to 100 moles, preferably, 1 to 70 moles per glucose unit of pullulan, depending on the carboxyl group content of the intended carboxylated pullulan.

The oxidation can be carried out by either a dry process or wet process, though the latter is more generally used. In the dry process, no solvent is used and the oxidation is effected by spraying the oxidizing agent onto pullulan. In the wet process, pullulan and the oxidizing agent are allowed to react in solution. Since pullulan is easily soluble in water, when water is used as solvent, oxidation may be carried out in a homogeneous system and pullulan is oxidized uniformly. This is an advantage of pullulan in oxidation over starch and cellulose which are difficultly soluble in water. The amount to be used of water is preferably 100 to 2,000 parts by weight for 100 parts by weight of pullulan. When liquid oxidizing agents such as fuming nitric acid, phosphoric acid-sodium nitrite, and nitric acid-formic acid are used, there is no need to use a solvent, because the oxidizing agent itself serves as solvent.

The reaction temperature is not particularly restricted and the carboxyl group content increases with the increase in reaction temperature. However, in order to avoid any hydrolysis, a preferred reaction temperature is in the range from 0° to 80° C, preferably 0° to 30° C. The oxidation can be carried out under ordinary pressure or superatmospheric pressures. The reaction time is not critical, but generally 30 minutes to 7 hours depending on the type of oxidizing agent and the intended degree of carboxylation.

As mentioned above, highly uniformly carboxylated pullulan may be obtained according to this invention.

The invention is illustrated below in detail with reference to Examples which are merely illustrative and not limitative.

EXAMPLE 1

Into an oxidizing solution comprising 125 parts by weight of fuming nitric acid and 250 parts by weight of water, was added 25 parts by weight of pullulan (molecular weight: 350,000). The mixture was allowed to react with stirring at 18° C for 3 hours. The reaction mixture was poured into 1,000 parts of methanol to remove nitrogen oxides and to precipitate carboxylated pullulan in the form of white powder. The precipitates were collected by vacuum filtration, thoroughly washed with methanol and ethyl ether, and dried in vacuo over calcium chloride. The yield of carboxylated pullulan was 23.5 parts by weight and the carboxyl group content was 0.5% by weight. The product contained no nitrogen, as confirmed by elementary analysis.

EXAMPLE 2

Into an oxidizing solution comprising 125 parts by weight of fuming nitric acid and 62.5 parts by weight of water, was added 25 parts by weight of pullulan (molecular weight: 350,000). The mixture was allowed to react with stirring at 18° C for 3 hours and the reaction mixture was treated in the same manner as in Example 1 to obtain 19.7 parts by weight of carboxylated pullulan of a carboxyl group content of 3% by weight.

EXAMPLE 3

In 300 parts by weight of 90-% phosphoric acid, was dissolved 10 parts by weight of pullulan (molecular weight: 295,000). After addition of 2 parts by weight of sodium nitrite at 10° C, the solution was stirred for one hour. The reaction mixture was treated in the same manner as in Example 1 to obtain 8 parts by weight of carboxylated pullulan of a carboxyl group content of 10% by weight.

EXAMPLE 4

To 125 parts by weight of fuming nitric acid in a one-liter round bottom flask, was added 125 parts by weight of water and the resulting solution was maintained at 18° C. To the solution was added 25 parts by weight of pullulan (molecular weight: 360,000) and the resulting mixture was stirred for 3 hours to allow the reaction to proceed. The reaction mixture was poured into one liter of methanol to precipitate carboxylated pullulan. The precipitates were again dissolved in water and reprecipitated with methanol. The precipitates were collected by vacuum filtration, washed with methanol, then with ethyl ether, and dried over calcium chloride to obtain 22 parts by weight of carboxylated pullulan of a carboxyl group content of about 2% by weight.

EXAMPLE 5

20 wt %-Aqueous solution of carboxylated pullulan, which had been obtained in Example 3, was cast to obtain a film 30μ in thickness. Physical properties of the resulting film were compared with those of pullulan and oxidized starch which had been obtained by treating starch in the same manner as in Example 3. The results obtained were as shown in Table 1.

Table 1

| Sample | Content of carboxyl group (wt %) | Tensile strength (kg/cm$^2$) | Young's modulus (kg/cm$^2$) | Transparency | Solubility in cold water |
|---|---|---|---|---|---|
| Carboxylated pullulan obtained in Example 3 | 10 | 600 | 19,000 | Good | Good |
| Pullulan (M.W. 295,000) | 0 | 660 | 19,000 | Good | Good |
| Oxidized starch | 12 | —* | —* | Poor | Poor |

*No continuous film was formed since it was brittle.

EXAMPLE 6

The surface tension of 1 wt %-aqueous solution of carboxylated pullulan, which had been obtained in Example 3, was compared with that of pullulan. The results obtained were as shown in Table 2.

Table 2

| | Surface tension (at 20° C) |
|---|---|
| Carboxylated pullulan obtained in Example 3 | 51 (dyne/cm) |
| Pullulan (M.W. 295,000) | 68 (dyne/cm) |

What is claimed is:

1. Carboxylated pullulan wherein at least some of the hydroxymethyl groups of the glucose units of the pullulan are converted into carboxyl groups.

2. The carboxylated pullulan according to claim 1, wherein the molecular weight of the pullulan is 10,000 to 5,000,000.

* * * * *